US010225266B2

(12) United States Patent
Tanaka et al.

(10) Patent No.: US 10,225,266 B2
(45) Date of Patent: Mar. 5, 2019

(54) TRANSMISSION SYSTEM, MESSAGE AUTHENTICATION CODE GENERATING APPARATUS, RECEIVER, MESSAGE AUTHENTICATION CODE GENERATING METHOD, AND MESSAGE AUTHENTICATION CODE VERIFYING METHOD

(71) Applicant: KABUSHIKI KAISHA TOSHIBA, Minato-ku (JP)

(72) Inventors: Tatsuya Tanaka, Kawasaki (JP); Tomoo Yamakage, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 174 days.

(21) Appl. No.: 15/454,380

(22) Filed: Mar. 9, 2017

(65) Prior Publication Data
US 2017/0187727 A1  Jun. 29, 2017

Related U.S. Application Data

(63) Continuation of application No. PCT/JP2015/070872, filed on Jul. 22, 2015.

(30) Foreign Application Priority Data

Oct. 31, 2014 (JP) .................................. 2014-223049

(51) Int. Cl.
*H04L 29/06* (2006.01)
*H04N 21/2389* (2011.01)
(Continued)

(52) U.S. Cl.
CPC .......... *H04L 63/123* (2013.01); *H04L 9/3242* (2013.01); *H04L 9/3297* (2013.01);
(Continued)

(58) Field of Classification Search
CPC ... H04L 63/123; H04L 9/3297; H04L 9/3242; H04L 2463/121; H04N 21/6437; H04N 21/2389
See application file for complete search history.

(56) References Cited

U.S. PATENT DOCUMENTS 6,092,191 A * 7/2000 Shimbo ............... H04L 63/0428
380/258
2002/0141585 A1* 10/2002 Carr .................. H04L 29/06027
380/255
(Continued)

FOREIGN PATENT DOCUMENTS

JP        2009-20401       1/2009
WO    WO 2015/034020 A1    3/2015

OTHER PUBLICATIONS

International Search Report dated Oct. 20, 2015 in PCT/JP2015/070872 filed Jul. 22, 2015 (with English translation).
(Continued)

*Primary Examiner* — Anthony D Brown
*Assistant Examiner* — William A Corum, Jr.
(74) *Attorney, Agent, or Firm* — Oblon, McClelland, Maier & Neustadt, L.L.P.

(57) ABSTRACT

A transmission system includes a multiplexing apparatus and a message authentication code generating apparatus. The multiplexing apparatus multiplexes MMTP packets for video data and audio data to be transmitted to generate multiplexed data. The message authentication code generating apparatus generates a message authentication code in accordance with a message authentication scheme, using data except for at least either a time stamp or a packet counter in the MMTP packet included in the multiplexed data. The message authentication code generating apparatus adds the message authentication code to the MMTP packet.

10 Claims, 5 Drawing Sheets (51) Int. Cl.
*H04N 21/6437* (2011.01)
*H04L 9/32* (2006.01)

(52) U.S. Cl.
CPC ..... *H04N 21/2389* (2013.01); *H04N 21/6437* (2013.01); *H04L 2463/121* (2013.01)

(56) References Cited

U.S. PATENT DOCUMENTS

| | | | | |
|---|---|---|---|---|
| 2008/0222414 | A1* | 9/2008 | Wang | H04L 9/0643 713/161 |
| 2014/0314098 | A1* | 10/2014 | Park | H04L 12/1881 370/417 |
| 2015/0189337 | A1* | 7/2015 | Pedan | H04N 21/23605 370/474 |
| 2015/0288690 | A1* | 10/2015 | Pal | H04L 9/3242 713/181 |
| 2017/0149526 | A1* | 5/2017 | Yang | H04L 1/0042 |
| 2017/0180766 | A1* | 6/2017 | Iguchi | H04L 65/602 |
| 2017/0230125 | A1* | 8/2017 | Oh | H04H 60/06 |

OTHER PUBLICATIONS

Written Opinion dated Oct. 20, 2015 in PCT/JP2015/070872 filed Jul. 22, 2015.

"Conditional Access System (Second Generation) and CAS Program Download System Specifications for Digital Broadcasting", ARIB STD-B61, Ver. 1.0, Association of Radio Industries and Businesses (online), 2014, 36 pgs.

"Interim report (limited reception method) about the super high-definition television broadcast system", Council for information and communication information and communication technology sub-committee, Broadcast system Committee (40th), 2013, 63 pgs., (with machine generated English translation).

* cited by examiner

TRANSMISSION SYSTEM, MESSAGE AUTHENTICATION CODE GENERATING APPARATUS, RECEIVER, MESSAGE AUTHENTICATION CODE GENERATING METHOD, AND MESSAGE AUTHENTICATION CODE VERIFYING METHOD

CROSS-REFERENCE TO RELATED APPLICATIONS

This application is a Continuation Application of PCT Application No. PCT/JP2015/070872, filed Jul. 22, 2015 and based upon and claims the benefit of priority from prior Japanese Patent Application No. 2014-223049, filed Oct. 31, 2014, the entire contents of which are incorporated herein by reference.

FIELD

An embodiment of the present invention relates to a transmission system that transmits data by utilizing MMT (MPEG Multimedia Transport), a message authentication code generating apparatus and a message authentication code generating method used in this system, a receiver that receives data transmitted from this system, and a message authentication code verifying method used in this receiver.

BACKGROUND

In the current broadcasting system, media transport schemes of an MPEG-2 TS (Moving Picture Experts Group-2 Transport Stream) scheme and an RTP (Real-time Transport Stream) scheme are widely used. In these schemes, when attempting to cooperatively operate broadcasting and communication, various limitations arise. Therefore, MMT (MPEG Media Transport) is proposed as a new media transport scheme assuming the use of a variety of networks by utilizing MPEG.

In the case of authenticating a message in a transmission system adopting the MMT, a message authentication code is generated to prevent manipulating MMTP (MPEG Media Transport Protocol) packets. The authentication code generating apparatus adds a generated message authentication code to the end. of a payload of an MMTP packet and outputs the packet. The authentication code generating apparatus outputs a message authentication scheme identifier that is a value for distinguishing a message authentication scheme by including it in a message authentication scheme descriptor in a CA (Conditional Access) message or a PA (Package Access) message.

As a mechanism for detecting manipulated packets, a checksum which is used in a UDP (User Datagram Protocol) is known. In a UDP, a checksum is calculated using UDP headers, pseudo headers, and data of UDP payload parts. If the checksum is replaced with an MMT scheme, the authentication code generating apparatus is to generate a message authentication code using data from headers to payload parts of MMTP packets.

In some cases, in a transmission system adopting an MMT, a processor constituting the system may rewrite content of an MMTP packet. For example, when outputting MMTP packets, a multiplexing apparatus in a transmission system rewrites a value of at least either a time stamp or a packet counter included in an MMTP packet in accordance with a state of the MMTP packet at the time of outputting. Thus, in a case of rewriting content of an MMTP packet by a processor, a need of recalculating a message authentication code by the processor may arise. In a case of recalculating a message authentication code for each processor, the processor needs to be implemented with the authentication code generating unit for generating a message authentication code.

The authentication code generating unit may operate, for example, as described below. The authentication code generating unit detects an MMTP packet which is a CA message or PA message, and extracts a message authentication scheme descriptor from the detected CA message or PA message. The authentication code generating unit ascertains a message authentication scheme from the extracted message authentication scheme descriptor. The authentication code generating unit recalculates a message authentication code in accordance with the ascertained message authentication scheme for the MMTP packet for which its content is rewritten. Or, the authentication code generating unit recalculates a message authentication code for all the MMTP packets, and rewrites the message authentication scheme descriptor in the CA message or PA message.

DETAILED DESCRIPTION

In general, according to an embodiment, a transmission system includes a multiplexing apparatus and a message authentication code generating apparatus. The multiplexing apparatus multiplexes MMTP (MPEG Multimedia Transport Protocol) packets for video data and audio data to be transmitted to generate multiplexed data. The message authentication code generating apparatus generates a message authentication code in accordance with a message authentication scheme, using data except for at least either a time stamp or a packet counter in the MMTP packet included in the multiplexed data. The message authentication code generating apparatus adds the message authentication code to the MMTP packet.

Embodiments will be described with reference to the drawings.

Figure 1:
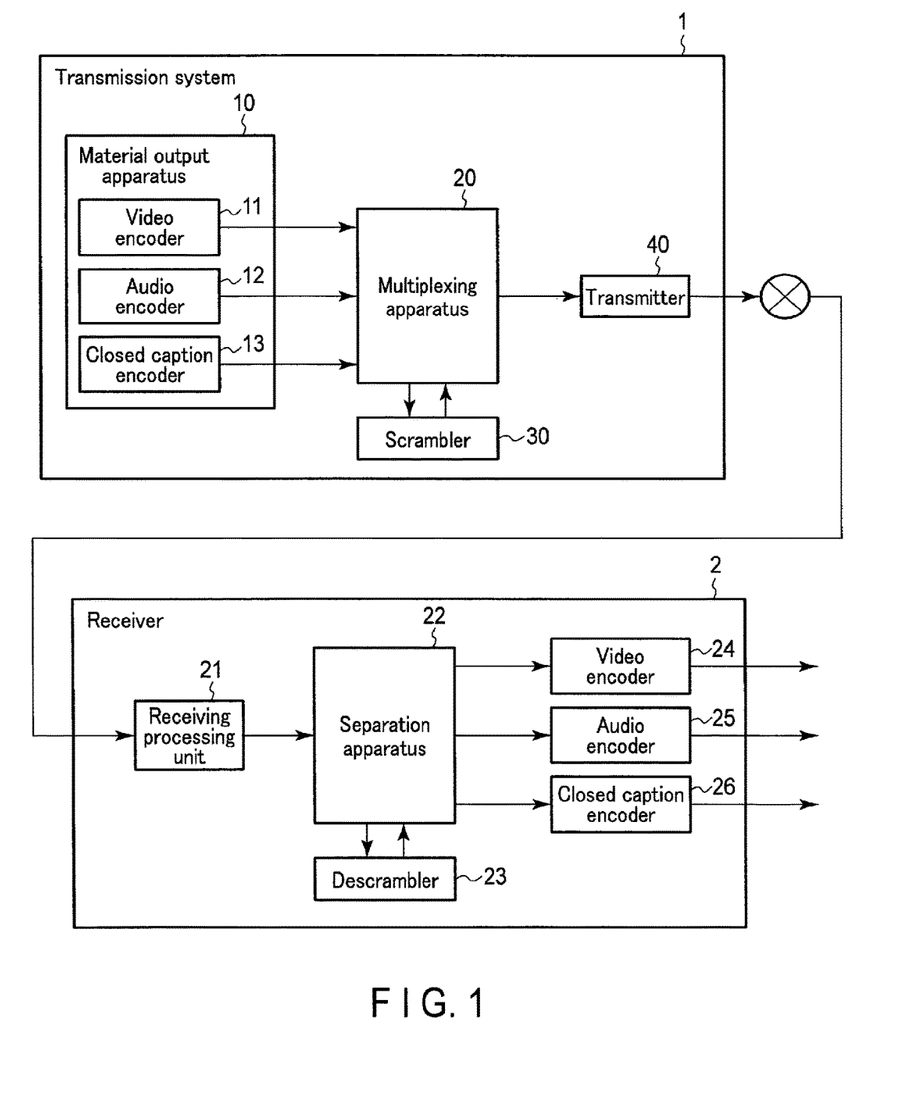
FIG. 1 is a block diagram showing a functional configuration of a transmission system and a receiver according to the present embodiment.

FIG. 1 is a block diagram showing an example of a functional configuration of a transmission system 1 and a receiver 2 according to the present embodiment. The transmission system 1 shown in FIG. 1 comprises a material output apparatus 10, a multiplexing apparatus 20, a scrambler 30, and a transmitter 40.

The material output apparatus 10 comprises, for example, a video encoder 11, an audio encoder 12, and a closed caption encoder 13. The video encoder 11 encodes video data to generate MMTP (MPEG Media Transport Protocol) packets of a sequence of video images. The audio encoder 12 encodes audio data to generate MMTP packets of audio. The closed caption encoder 13 encodes closed caption data to generate MMTP packets of closed captions. The material output apparatus 10 outputs a plurality of kinds of MMTP packets for video images, audio, and closed captions to the multiplexing apparatus 20. The MMTP packets include an SI (Service Information) packet. The SI packet includes MMT configuration information which is information about a configuration of an MMTP packet. The SI packet also includes a CA (Conditional Access) message or a PA (Package Access) message in which a message authentication scheme descriptor is placed, which will be described later.

Figure 2:
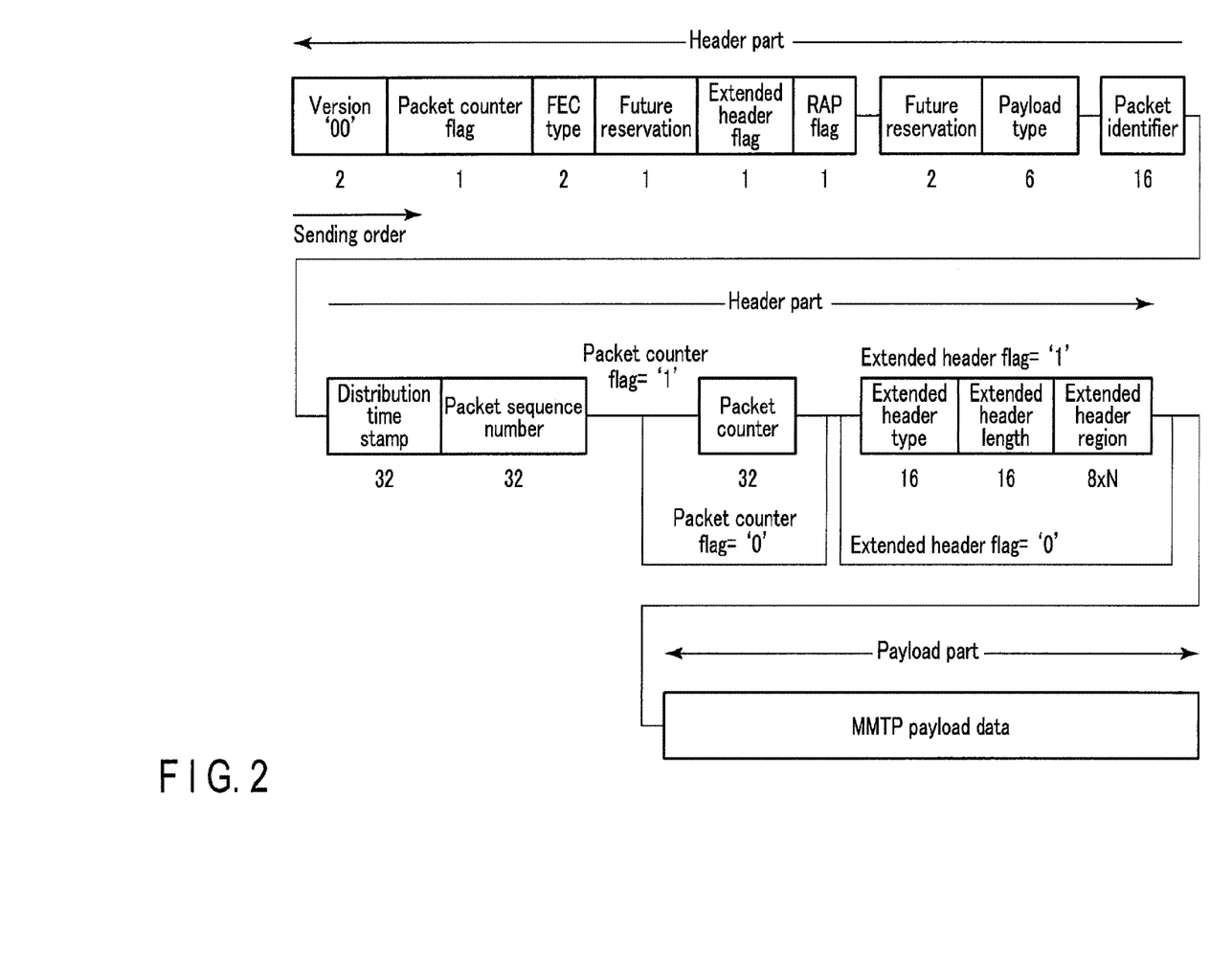
FIG. 2 is a diagram showing a structure of an MMTP packet generated in the transmission system shown in FIG. 1.

For example, an MMTP packet has a structure shown in FIG. 2. In other words, the MMTP packet shown in FIG. 2 comprises a header part which includes packet information about the MMTP packet and a payload part which includes actual data.

The multiplexing apparatus 20 multiplexes the MMTP packets that are output from the material output apparatus 10 and obtains multiplexed data. The multiplexing apparatus 20 outputs the multiplexed data to the scrambler 30. The multiplexing apparatus 20 outputs to the transmitter 40 the multiplexed data to which adding of a message authentication code and scrambling have been applied by the scrambler 30.

The scrambler 30 includes, for example, a CPU (Central Processing Unit), and a storage area, etc. for programs and data necessary for a CPU to execute processing, such as a ROM (Read Only Memory) and a RAM (Random Access Memory). The scrambler 30 realizes the functions of the message authentication code generating unit 31 and the encrypting unit 32 shown in FIG. 3 by having the CPU execute an application program.

Figure 4:
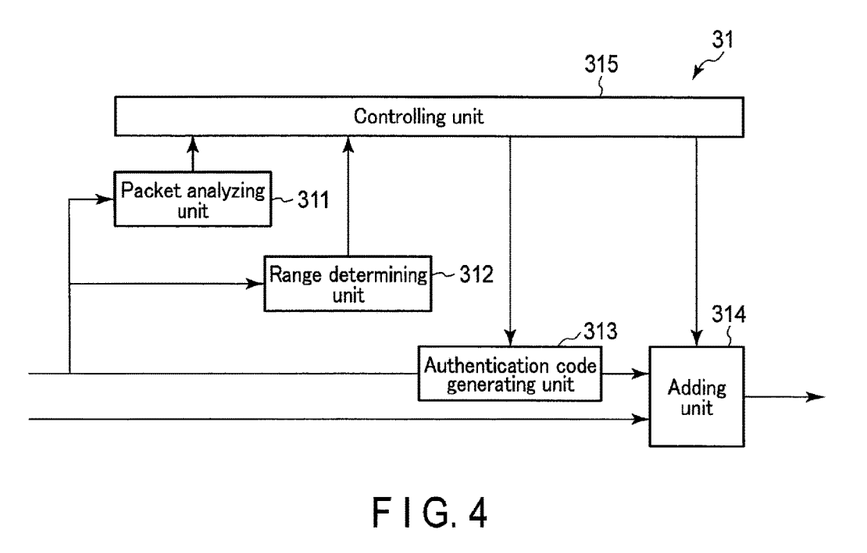
FIG. 4 is a block diagram showing a functional configuration of the message authentication code generating unit shown in FIG. 3.

The message authentication code generating unit 31 comprises functions of a packet analyzing unit 311, a range determining unit 312, an authentication code generating unit 313, an adding unit 314, and a controlling unit 315, shown in FIG. 4.

The packet analyzing unit 311 receives the multiplexed data that is output from the multiplexing apparatus 20. The packet analyzing unit 311 analyzes an MMTP packet included in the received multiplexed data to calculate a byte position where a message authentication code is to be added. Herein, the byte position is, for example, an end of the payload in the MMTP packet. The packet analyzing unit 311 outputs information about the calculated byte position to the controlling unit 315.

The range determining unit 312 receives the multiplexed data that is output from the multiplexing apparatus 20. The range determining unit 312 analyzes an MMTP packet included in the received multiplexed data, and determines a data range which is used when a message authentication code is generated.

For example, in a case of using a payload part to generate a message authentication code, the range determining unit 312 distinguishes a position where the payload part begins, and determines the payload part after the distinguished position as a target range. The range determining unit 312 outputs range information about the target range to the controlling unit 315.

In a case of generating a message authentication code using the data except for a time stamp, the range determining unit 312 determines the data except for the time stamp as a target range. The time stamp is a value indicating when a packet is transmitted. The time stamp is used on the receiver 2 side for jitter measurement, etc. of a transmission path. The position of a time stamp in an MMTP packet is known. The range determining unit 312 outputs range information to the controlling unit 315.

In a case of using the data except for the packet counter to generate a message authentication code, the range determining unit 312 distinguishes the packet counter flag, and determines data except for a packet counter that exists only in predetermined bytes after the packet counter flag as a target range. The packet counter means a serial number of a packet. The range determining unit 312 outputs range information to the controlling unit 315.

The authentication code generating unit 313 receives the multiplexed data that is output from the multiplexing apparatus 20. The authentication code generating unit 313 receives a message authentication scheme and the range information from the controlling unit 315. The message authentication scheme is a scheme for generating a message authentication code, and indicates a method of generating a message authentication code using a hash function, such as SHA-1 and MD5, etc. The authentication code generating unit 313 generates a message authentication code based on the message authentication scheme using data in a range in an MMTP packet included in the received multiplexed data, in accordance with the range information. The authentication code generating unit 313 outputs the generated message authentication code to the adding unit 314. If message authentication is not carried out, only the multiplexed data is input to the adding unit 314.

The adding unit 314 receives the multiplexed data that is output from the multiplexing apparatus 20 and the message authentication code generated in the authentication code generating unit 313. The adding unit 314 receives from the controlling unit 315 information regarding a byte position to which the message authentication code is to be added. The adding unit 314 adds the generated message authentication code to a position in an MMTP packet included in the received multiplexed data in accordance with the byte position. The adding unit 314 outputs the multiplexed data including the MMTP packets to which the message authentication code is added to the multiplexing apparatus 20.

The controlling unit 315 controls processing in the authentication code generating unit 313. If message authentication is not carried out, the controlling unit 315 notifies that to the authentication code generating unit 313. If message authentication is carried out, the controlling unit 315 outputs the message authentication scheme and the range information that is output from the range determining unit 312 to the authentication code generating unit 313, and controls the authentication code generating unit 313.

The controlling unit 315 outputs to the adding unit 314 information about the byte position that is output from the packet analyzing unit 311, and controls the adding unit 314. If message authentication is not carried out, the controlling unit 315 notifies that to the adding unit 314.

The controlling unit 315 places in the CA message or PA message in the SI packet the message authentication scheme descriptor indicating the message authentication scheme that was used by the authentication code generating unit 313 to generate the message authentication code. The controlling unit 315 outputs to the multiplexing apparatus 20 the multiplexed data including the SI packet in which the message authentication scheme descriptor is placed.

Figure 3:
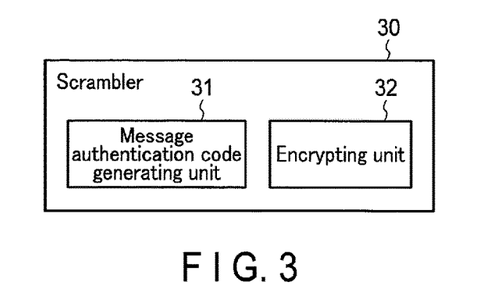
FIG. 3 is a block diagram showing a functional configuration of the scrambler shown in FIG. 1.

The encrypting unit 32 applies scrambling to corresponding data in an MMTP packet included in the multiplexed data, using a preset cryptographic algorithm.

The transmitter 40 transmits the multiplexed data that is output from the multiplexing apparatus 20. The transmitter 40 transmits the multiplexed data on which the transmission processing is performed as an MMT stream.

The receiver 2 shown in FIG. 1 comprises a receiving processing unit 21, a separation apparatus 22, a descrambler 23, a video decoder 24, an audio decoder 25, and a closed caption decoder 26.

The receiving processing unit 21 receives an MMT stream transmitted from the transmission system 1. The receiving processing unit 21 performs reception processing on the received MMT stream. The receiving processing unit 21 outputs the processed signals to the separation apparatus 22.

The separation apparatus 22 separates the MMTP packets of video images, audio, and closed captions that are multiplexed on the signals that are output from the receiving processing unit 21. The separation apparatus 22 outputs the separated MMTP packets to the descrambler 23. The separation apparatus 22 also receives the descrambled MMTP packets from the descrambler 23. The separation apparatus 22 outputs the MMTP packets of video images that are output from the descrambler 23 to the video decoder 24. The separation apparatus 22 outputs the MMTP packets of audio output that are output from the descrambler 23 to the audio decoder 25. The separation apparatus 22 outputs to the closed caption decoder 26 the MMTP packets of closed captions that are output from the descrambler 23.

The descrambler 23 includes, for example, a CPU, and a storage area, etc. for programs and data necessary for a CPU to execute processing, such as a ROM and a RAM. The descrambler 23 realizes the functions of the distinguishing unit 231 and the decrypting unit 232 shown in FIG. 5 by having the CPU execute an application program.

Figure 6:
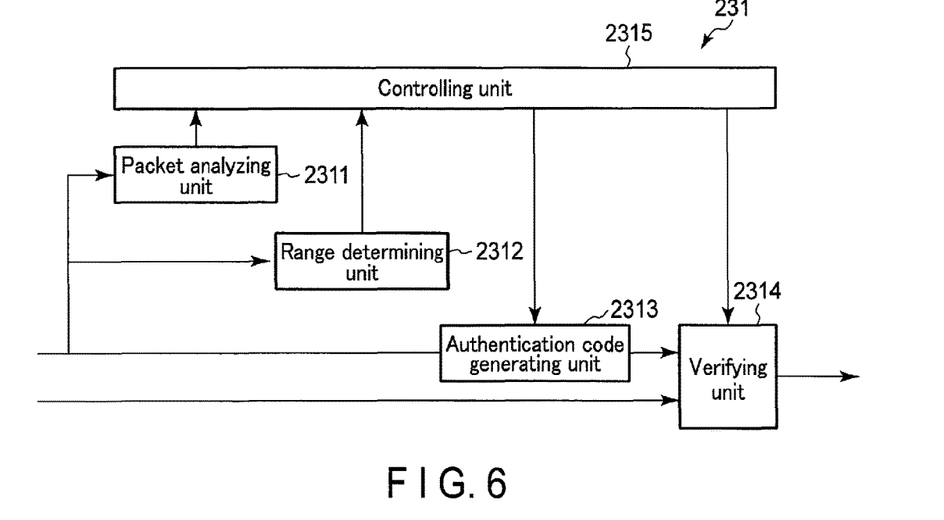
FIG. 6 is a block diagram showing a functional configuration of the determining unit shown in FIG. 5.

The distinguishing unit 231 comprises functions of a packet analyzing unit 2311, a range determining unit 2312, an authentication code generating unit 2313, a verifying unit 2314, and a controlling unit 2315, shown in FIG. 6.

The packet analyzing unit 2311 receives the MMTP packets that are output from the separation apparatus 22. The packet analyzing unit 2311 analyzes the received MMTP packet, and calculates a byte position to which the message authentication code is added. The packet analyzing unit 2311 analyzes the received MMTP packet, and obtains the message authentication scheme descriptor placed in the CA message or PA message of the SI packet. The packet analyzing unit 2311 outputs information about the calculated byte position and the message authentication scheme descriptor to the controlling unit 2315.

The range determining unit 2312 receives the MMTP packets that are output from the separation apparatus 22. The range determining unit 2312 analyzes the received MMTP packets, and determines a data range which is used when a message authentication code is generated. The range determining unit 2312 outputs range information to the controlling unit 2315.

The authentication code generating unit 2313 receives the MMTP packets that are output from the separation apparatus 22. The authentication code generating unit 2313 receives a message authentication scheme and the range information from the controlling unit 2315. The authentication code generating unit 2313 generates a message authentication code based on the message authentication scheme using data in a range in a received MMTP packet, in accordance with the range information. The authentication code generating unit 2313 outputs the generated message authentication code to the verifying unit 2314.

The verifying unit 2314 receives the MMTP packets that are output from the separation apparatus 22 and the message authentication code generated in the authentication code generating unit 2313. The verifying unit 2314 receives information about a byte position from the controlling unit 2315. The verifying unit 2314 reads the message authentication code from the received MMTP packets in accordance with the byte position. The verifying unit 2314 verifies the read message authentication code with the message authentication code generated in the authentication code generating unit 2313. The verifying unit 2314 outputs to a subsequent stage information as to whether the message authentication code is correct or not. An incorrect message authentication code means that the data has been manipulated.

The controlling unit 2315 controls processing in the distinguishing unit 231. The controlling unit 2315 obtains a message authentication scheme from the message authentication scheme descriptor that is output from the packet analyzing unit 2311. The controlling unit 2315 outputs the message authentication scheme and the range information that is output from the range determining unit 2312 to the authentication code generating unit 2313, and controls the authentication code generating unit 2313. The controlling unit 2315 outputs to the verifying unit 2314 information about the byte position that is output from the packet analyzing unit 2311, and controls the verifying unit 2314.

Figure 5:
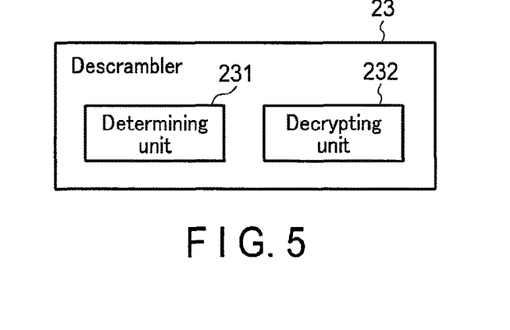
FIG. 5 is a block diagram showing a functional configuration of the descrambler shown in FIG. 1.

The decrypting unit 232 applies descrambling to corresponding data in an MMTP packet, using a preset cryptographic algorithm.

The video decoder 24 decodes the MMTP packets of video images that are output from the separation apparatus 22, and outputs them to devices of subsequent stages including a display unit. The audio decoder 25 decodes the MMTP packets of audio that are output from the separation apparatus 22, and outputs them to devices of subsequent stages including a display unit. The closed caption decoder 26 decodes the MMTP packets that are output from the separation apparatus 22, and outputs them to devices of subsequent stages including a display unit.

Next, the operation of the transmission system 1 and the receiver 2 accordingly configured will be described.

Figure 7:
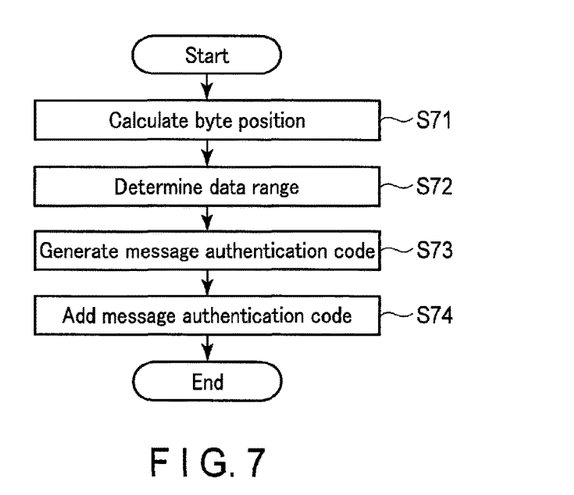
FIG. 7 is a drawing showing a flowchart executed when the message authentication code generating unit shown in FIG. 4 generates a message authentication code.

FIG. 7 is a drawing showing a flowchart executed when the message authentication code generating unit 31 according to the present embodiment generates a message authentication code.

First, the packet analyzing unit 311 analyzes an MMTP packet included in the multiplexed data that is output from the multiplexing apparatus 20, and calculates a byte position where a message authentication code is to be added (step S71).

The range determining unit 312 analyzes an MMTP packet included in the multiplexed data that is output from the multiplexing apparatus 20, and determines a data range which is used when a message authentication code is generated (step S72).

The authentication code generating unit 313 generates a message authentication code based on a message authentication scheme, using data in a range in a MMTP packet included in the multiplexed data that is output from the multiplexing apparatus 20, in accordance with the range information (step S73).

The adding unit 314 adds the generated message authentication code to a position in an MMTP packet included in the multiplexed data that is output from the multiplexing apparatus 20 in accordance with the byte position.

Figure 8:
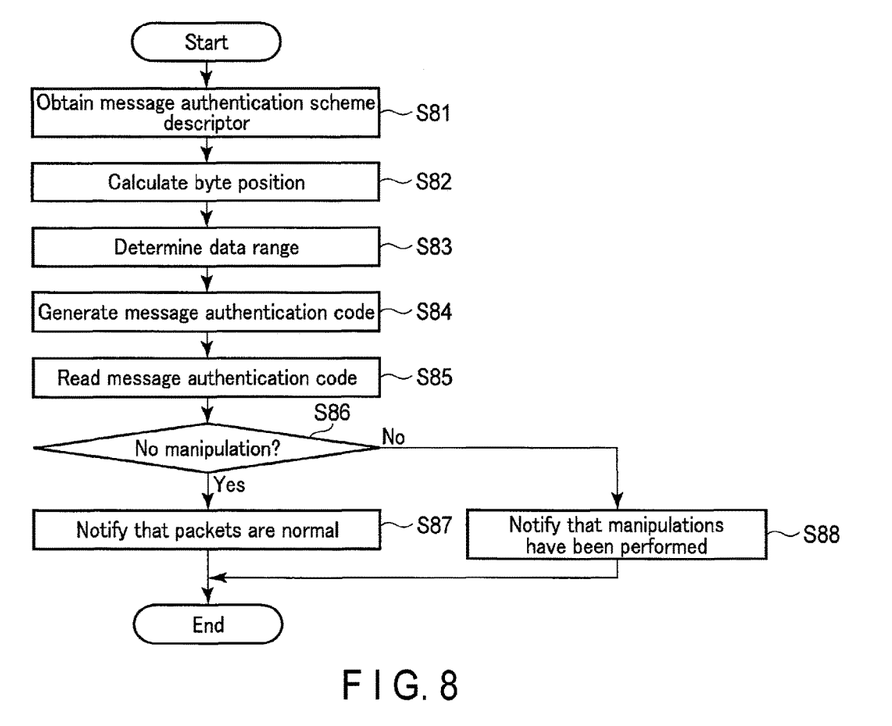
FIG. 8 is a drawing showing a flowchart executed when the distinguishing unit shown in FIG. 6 verifies a message authentication code.

FIG. 8 is a drawing showing a flowchart executed when the distinguishing unit 231 according to the present embodiment verifies a message authentication code.

First, the packet analyzing unit 2311 analyzes the MMTP packets that are output from the separation apparatus 22, and obtains a message authentication scheme descriptor to be placed in a CA message or PA message of an SI packet (step S81). If no message authentication scheme descriptor is present, it is assumed that no message authentication is carried out, and the processes thereafter will be skipped.

The packet analyzing unit 2311 analyzes an MMTP packet that is output from the separation apparatus 22, and calculates a byte position to which a message authentication code is added (step S82).

The range determining unit 2312 analyzes an MMTP packet that is output from the separation apparatus 22, and determines a data range which is used when a message authentication code is generated (step S83).

The authentication code generating unit 2313 generates a message authentication code based on a message authentication scheme, using data in a range in a MMTP packet included in the multiplexed data that is output from the separation apparatus 22, in accordance with the range information (step S84).

The verifying unit 2314 reads the message authentication code from the received MMTP packet that is output from the separation apparatus 22 in accordance with the byte position (step S85). The verifying unit 2314 verifies the read message authentication code with the message authentication code generated in the authentication code generating unit 2313, and determines if data has been manipulated (step S86). If data is not manipulated, the verifying unit 2314 notifies a subsequent stage that the data is normal (step S87), and finishes the process. If data is manipulated the verifying unit 2314 notifies a subsequent stage that the manipulations have been performed (step S88), and finishes the process.

As described in the foregoing, in the present embodiment, in the scrambler 30 of the transmission system 1, the packet analyzing unit 311 calculates a byte position where a message authentication code is to be added. The range determining unit 312 determines a data range which is used when a message authentication code is generated. The authentication code generating unit 313 generates a message authentication code using data in the determined data range. And then, the adding unit 314 adds the generated authentication code to the calculated byte position. Thus, even if the data outside of the determined data range is rewritten, the message authentication code will not be changed.

In the present embodiment, in the descrambler 23 of the receiver 2, the packet analyzing unit 2311 calculates a byte position of the message authentication code added by the transmission system 1, and obtains a message authentication scheme descriptor. The range determining unit 2312 determines a data range which is used when a message authentication code is generated. The authentication code generating unit 2313 generates a message authentication code using data in the determined data range based on the obtained message authentication scheme descriptor. Then, the verifying unit 2314 reads the message authentication code from the received MMTP packet based on the byte position, and verifies the read message authentication code with the generated message authentication code. It is thus possible to determine if manipulations have been performed or not based on a message authentication code added to an MMTP packet which is transmitted from the transmission system 1.

Thus, according to the transmission system 1 and the receiver 2 of the present embodiment, even when content of a MMTP packet is rewritten, recalculation of a message authentication code becomes unnecessary. A system adopting an MMT can achieve effects of, for example, preventing complicated process and process delay.

While an embodiment of the present invention has been described, the embodiment has been presented by way of example only, and is not intended to limit the scope of the invention. Indeed, the embodiment described herein may be embodied in a variety of other forms; furthermore, various omissions, substitutions, and changes in the form of the embodiment described herein may be made without departing from the spirit of the invention. The accompanying claims and their equivalents are intended to cover such forms or modifications as would fall within the scope and spirit of the invention.

What is claimed is:

1. A transmission system comprising:
   a multiplexing apparatus that multiplexes MMTP (MPEG Multimedia Transport Protocol) packets for video data and audio data to be transmitted to generate multiplexed data; and
   a message authentication code generating apparatus that generates a message authentication code in accordance with a message authentication scheme, using any portion of data of the MMTP packet other than a time stamp or a packet counter in the MMTP packet included in the multiplexed data, and appends the message authentication code to the MMTP packet.

2. The transmission system according to claim 1, wherein the message authentication code generating apparatus generates the message authentication code using a payload part in the MMTP packet.

3. A message authentication code generating apparatus comprising:
   a processor that
      analyzes an MMTP (MPEG Media Transport Protocol) packet for video data and audio data included in multiplexed data to calculate a position to which a message authentication code is to be added;
      determines a data range using any portion of data of the MMTP packet other than a time stamp or a packet counter in the MMTP packet;
      generates a message authentication code in accordance with a message authentication scheme using data in the determined data range in the MMTP packet; and
      appends the generated message authentication code to the calculated position.

4. The message authentication code generating apparatus according to claim 3, wherein the processor determines a data range indicating a payload part in the MMTP packet as the data range to be used for generating the message authentication code.

5. A receiver, comprising:
   a processor that
      analyzes a first MMTP (MPEG Media Transport Protocol) packet for video data and audio data to calculate a position to which a first message authentication code is added;
      analyzes the first MMTP packet or a second MMTP packet which is different from the first MMTP packet to obtain a message authentication scheme descriptor;

determines a data range using any portion of data of the first MMTP packet other than a time stamp or a packet counter in the first MMTP packet;

generates a second message authentication code in accordance with a message authentication scheme that is distinguished by the message authentication scheme descriptor, using data in the determined data range in the first MMTP packet; and determines whether the generated second message authentication code matches the first message authentication code which is read from the calculated position.

6. The receiver according to claim 5, wherein the processor determines a data range indicating a payload part in the first MMTP packet as the data range to be used for generating the second message authentication code.

7. A message authentication code generating method implemented using at least one processor, the method comprising:

analyzing an MMTP (MPEG Media Transport Protocol) packet for video data and audio data included in multiplexed data to calculate a position to which a message authentication code is to be added;

determining a data range using any portion of data of the MMTP packet other than a time stamp or a packet counter in the MMTP packet;

generating a message authentication code in accordance with a message authentication scheme using data in the determined data range in the first MMTP packet; and appending the generated message authentication code to the calculated position.

8. The message authentication code generating method according to claim 7, wherein the data range is a data range indicating a payload part in the MMTP packet.

9. A message authentication code verifying method implemented using at least one processor, the method comprising:

analyzing a first MMTP (MPEG Media Transport Protocol) packet for video data and audio data to calculate a position to which a first message authentication code is added;

analyzing the first MMTP packet or a second MMTP packet which is different from the first MMTP packet to obtain a message authentication scheme descriptor;

determining a data range using any portion of data of the first MMTP packet other than a time stamp or a packet counter in the first MMTP packet;

generating a second message authentication code in accordance with a message authentication scheme which is distinguished by the message authentication scheme descriptor, using data in the determined data range in the first MMTP packet; and reading the first message authentication code from the calculated position in the first MMTP packet; and determining whether the generated second message authentication code matches the first message authentication code which is read from the calculated position.

10. The message authentication code verifying method according to claim 9, wherein the data range is a data range indicating a payload part in the first MMTP packet.

* * * * *